(12) United States Patent
Ali et al.

(10) Patent No.: US 11,968,936 B2
(45) Date of Patent: Apr. 30, 2024

(54) METHOD OF DETERMINING PLANT HEALTH

(71) Applicant: YARA INTERNATIONAL ASA, Oslo (NO)

(72) Inventors: Idaly Ali, Singapore (SG); Robin Yeo, Singapore (SG); Muhammad Izuddin, Singapore (SG); Navin Twarakavi, Whitefield (IN)

(73) Assignee: YARA INTERNATIONAL ASA, Oslo (NO)

(*) Notice: Subject to any disclaimer, the term of this patent is extended or adjusted under 35 U.S.C. 154(b) by 295 days.

(21) Appl. No.: 17/442,243

(22) PCT Filed: Jun. 8, 2020

(86) PCT No.: PCT/EP2020/065786
§ 371 (c)(1),
(2) Date: Sep. 23, 2021

(87) PCT Pub. No.: WO2020/249503
PCT Pub. Date: Dec. 17, 2020

(65) Prior Publication Data
US 2022/0192100 A1   Jun. 23, 2022

(30) Foreign Application Priority Data
Jun. 12, 2019 (EP) .................................. 19179689

(51) Int. Cl.
*G06F 3/048* (2013.01)
*A01G 7/00* (2006.01)
(Continued)

(52) U.S. Cl.
CPC .................. *A01G 7/00* (2013.01); *G01J 3/52* (2013.01); *G01N 2021/8466* (2013.01)

(58) Field of Classification Search
CPC ...... A01G 7/00; G01J 3/52; G01N 2021/8466
See application file for complete search history.

(56) References Cited

U.S. PATENT DOCUMENTS 6,080,950 A * 6/2000 Jalink ................. G01N 21/6486
250/341.8
6,734,973 B1 * 5/2004 Mutters .................... A01G 7/00
356/421

(Continued)

FOREIGN PATENT DOCUMENTS

CN         104132897 A    11/2014
CN         204330579 U     5/2015
(Continued)

OTHER PUBLICATIONS

Singh et al., Automated Color Prediction of Paddy Crop Leaf using Image Processing, IEEE, 9 pages (Year: 2015).*
(Continued)

Primary Examiner — Linh K Pham
(74) Attorney, Agent, or Firm — Dilworth IP, LLC

(57) ABSTRACT

A method of determining health of a plant which method includes displaying, on a screen of an electronic display of a mobile computing device, a digital leaf colour chart with colours ranging from yellow green to dark green; displaying on the screen next to the digital leaf colour chart a white area on which a leaf of the plant is to be placed; receiving input to the mobile computing device from a user about which colour of the digital leaf colour chart that best matches the leaf placed on the white area; and the mobile computing device determining the plant health based on the received input.

15 Claims, 5 Drawing Sheets

(51) Int. Cl.
*G01J 3/52* (2006.01)
*G01N 21/84* (2006.01)

(56) References Cited

U.S. PATENT DOCUMENTS

| | | | |
|---|---|---|---|
| 9,075,008 B2* | 7/2015 | Holland | G01N 21/31 |
| 2001/0016053 A1* | 8/2001 | Dickson | G01J 3/2823 |
| | | | 382/110 |
| 2001/0036295 A1* | 11/2001 | Hendrickson | G06V 20/13 |
| | | | 382/110 |
| 2006/0250668 A1 | 11/2006 | Komiya | |
| 2010/0232688 A1 | 9/2010 | Komiya | |
| 2013/0044919 A1* | 2/2013 | Purcell | G06V 10/56 |
| | | | 382/110 |
| 2013/0325346 A1 | 12/2013 | Mcpeek | |
| 2014/0232923 A1* | 8/2014 | Koh | G01J 3/0264 |
| | | | 345/589 |
| 2016/0231171 A1* | 8/2016 | Assefa | G01J 3/0272 |
| 2017/0131200 A1* | 5/2017 | Raveh | G01N 21/21 |
| 2017/0148181 A1* | 5/2017 | Lin | G06T 7/0004 |
| 2017/0358106 A1* | 12/2017 | Yoshimura | G06T 7/0012 |
| 2018/0003686 A1 | 1/2018 | Ozcan | |
| 2018/0259496 A1* | 9/2018 | McPeek | G01N 33/025 |
| 2018/0267006 A1 | 9/2018 | Wallbridge | |
| 2019/0014245 A1* | 1/2019 | Rhoads | H04N 9/73 |
| 2020/0090372 A1* | 3/2020 | Reusch | G06T 7/0002 |
| 2021/0382025 A1* | 12/2021 | Reusch | G01J 3/28 |

FOREIGN PATENT DOCUMENTS

| | | | |
|---|---|---|---|
| CN | 106404682 A | 2/2017 | |
| CN | 106954385 A | 7/2017 | |
| CN | 109142355 A | 1/2019 | |
| CN | 109444133 A | 3/2019 | |
| CN | 113923976 A | 1/2022 | |
| CO | 5640059 A2 | 5/2006 | |
| EP | 3477271 | 5/2019 | |
| EP | 3477271 A1 * | 5/2019 | G01J 3/0205 |
| GB | 2541468 | 2/2017 | |
| GB | 2541468 A * | 2/2017 | A01G 7/00 |
| JP | 2005160423 A * | 6/2005 | |
| WO | 2016106215 | 6/2016 | |
| WO | WO-2019081729 A1 * | 5/2019 | G01J 3/0205 |

OTHER PUBLICATIONS

Bej et al., Real-Time Robotic Vision Application for Health Monitoring of Paddy Plants, IEEE, 4 pages. (Year: 2022).*
Mitu et al., Rice Plant Nitrogen Deficiency Detection by leaf Color Chart (LCC), Mayn, 2019, Daffodil International University, 33 pages.*
Astika et al., Prediction of Color Level and Chlorophyll Content of Corn (*Zea mays* L.) Leaves by Using Mobile Phone Cameras, 2018, MEBSE, 7 pages.*
Chinese Office Action issued in App. No. CN202080042762.1, dated Jul. 19, 2022, 9 pages.
International Search Report and Written Opinion in related PCT/EP2020/065786, dated Aug. 27, 2020, 15 pages.

* cited by examiner

METHOD OF DETERMINING PLANT HEALTH

TECHNICAL FIELD

The present invention relates to a method for determining plant health. The present invention also relates to a computer program product, a computer-readable storage medium, an electrical signal, and a mobile computing device.

BACKGROUND

By keeping track of plant health, in particular the nitrogen content, one can see if and when the plant needs fertilizer, in order to improve crop yield.

Leaf Colour Chart (LCC) is one nitrogen management tool that is used to determine the N fertilizer needs of rice crops. LCC is a plastic device that has at least four green strips, with colour ranging from yellow green to dark green. Each of the colour strips is given a number that increases with increasing greenness. One can determine the nitrogen status of a crop by comparing the colour of a representative leaf with the LCC. An example of a physical LCC is disclosed in U.S. Pat. No. 6,734,973.

While LCC has been widely accepted, it suffers from some inherent drawbacks. Some of these drawbacks render it to be highly unscalable. Firstly, LCC is a physical plastic product that needs to be manufactured and marketed to reach the farmers worldwide. Secondly, being a physical product that is used in harsh field conditions, LCC is prone to damage such as loss of colour, physical damage, UV effects on the paint among others. Thirdly, the colour strips are not adaptable (to the crop type or variety, i.e. one needs a different LCC for each different crop that is cultivated) and cannot be changed to eventually gain higher accuracy.

Various attempts have been made to use a (phone) camera to detect the colour of the leaf and compare and match it with the colours of the LCC, an example of which is disclosed in US2010/0232688.

US2017/358106A1 (Yoshimura, 2017) discloses a mobile computing device for determining plant health, wherein the mobile computing device comprises an electronic display.

EP3477271A1 (Yara International, 2019) discloses a handheld device for determining a plant status. The device comprises a multi pixel digital colour sensor, a light source, a light guide and a sample space.

WO2016/106215A1 (University of California, 2016) discloses a method and a device for quantifying a plant chlorophyll content. The device comprises a leaf-holding illuminator device comprising a power source, a plurality of switchable light sources and a cap.

US2014/232923A1 (Koh, 2014) discloses a method for operating a colour comparison graphical user interface.

From these various attempts, some limitations have been observed. For example, they may require an advanced phone with a very good camera. Also, ambient lighting has an impact on leaf colours which renders phone camera-based methods to be unreliable. Phone cameras are known to have difficulties to correctly identify a colour, doing so accurately requires calibration means, for example a set of papers with predefined colours.

SUMMARY OF THE INVENTION

It is an object of the present invention to overcome or at least alleviate the aforementioned problems.

According to a first aspect of the present invention, this and other objects is achieved by a method of determining the health of a plant, which method comprises: displaying, on a screen of an electronic display of a mobile computing device, a digital leaf colour chart with colours ranging from yellow green to dark green; displaying on the screen next to the digital leaf colour chart a white area on which a leaf of the plant is to be placed; receiving input to the mobile computing device from a user about which colour of the digital leaf colour chart that best matches the leaf placed on the white area; and the mobile computing device determining the plant health (=the health of the plant) based on the received input.

The present invention is based on the understanding that by presenting the colours of the leaf colour chart on the mobile computing device screen so that the user (farmer) can choose the colour that matches his/hers leaf placed next to the leaf colour chart on the screen, the ambient light has minimal effect as its influence on the leaf colour will be the same as it has on colours displayed on the screen. Furthermore, by allocating a space within the screen with a white background where the farmer can place the leaf, any screen backlight colour will affect the leaf colour in the same way as it affects the digital LCC colours. Hence the reading of the present device is not influenced by the screen backlight colour. Overall, the present invention may readily provide an accurate determination of plant health, without the use of physical leaf colour charts or any (good) camera.

In one embodiment, the digital leaf colour chart comprises a plurality of green strips each having a different colour, each different colour being a colour of said colours ranging from yellow green to dark green, wherein the method comprises receiving (by the mobile computing device) input from the user about which green strip or which two adjacent green strips of the plurality of green strips that best matches the leaf placed on the white area, similar to the conventional physical LCC.

In another embodiment, the digital leaf colour chart comprises a gradual blend of said colours ranging from yellow green to dark green. In this way, the user can select the best matching colour more precisely.

The white area may have a width in the range of 80-100% of the width of the screen, and a height in the range of 30-50% of the height of the screen. In this way, the white area may be large enough relative to the leaf in order to allow the user to properly determine which colour of the digital leaf colour chart that best matches the leaf.

The digital leaf colour chart and the white area may be displayed (by the mobile computing device) with the screen set to maximum brightness. This can make it easier for the user to properly determine which colour of the digital leaf colour chart that best matches the leaf, in particular if the ambient light is strong.

The method may comprise receiving (by the mobile computing device) crop details associated with the plant's plot from the user, and selecting (by the mobile computing device) the digital leaf colour chart to display on the screen based on one or more of the received crop details. The crop details may include at least one of crop type (rice, wheat, maize, etc.), crop variety (e.g. traditional, aromatic, hybrid), sowing date, growing period (long, medium, short), and plot size. The mobile computing device may for example have stored thereon different digital leaf colour charts for different crop types and crop varieties.

The method may comprise receiving (by the mobile computing device) input from the user about which colour of the digital leaf colour chart (e.g. which green strip or which two adjacent green strips of the plurality of green strips) that best matches the leaf for a plurality of different leaves of the plot, and determining (by the mobile computing device) an average plant health based on the received input for the plurality of different leaves of the plot. The green strips of the digital leaf colour chart may have different scores (e.g. integers 2-5), whereby the score of the strip selected by the user for an individual leaf may be the determined plant health. In case the user selects two adjacent strips, the average score of those strips may be used. The average plant health may be the average score of the scores of the individual leaves. Ten different leaves may for example be used.

The method may comprise providing (by the mobile computing device) a fertilizer recommendation based at least partly on the determined average plant health. The fertilizer recommendation may be displayed on the aforementioned screen.

The screen may be a touchscreen, wherein the method comprises receiving (by the mobile computing device) input from the user about which colour of the digital leaf colour chart that best matches the leaf via the touchscreen.

The mobile computing device may be a smartphone or tablet. The smartphone or tablet may be a "generic" smartphone or tablet, wherein the above-described functionalities may be provided by means of an app stored on the smartphone or tablet.

The method may further comprise: the user placing the leaf on the white area displayed on the screen.

According to a second aspect of the present invention, there is provided a computer program product comprising computer program code to perform, when executed on a computer, the steps of: displaying, on a screen of an electronic display, a digital leaf colour chart with colours ranging from yellow green to dark green; displaying on the screen next to the digital leaf colour chart a white area on which a leaf of a plant is to be placed; receiving input from a user about which colour of the digital leaf colour chart that best matches the leaf placed on the white area; and determining the plant health (=the health of the plant) based on the received input. The computer program product may be a non-transitory computer program product. The computer may for example be the aforementioned mobile computing device. The computer program product may be an app (for a smartphone or tablet). This aspect may exhibit the same or similar features and technical effects as the first aspect, and vice versa.

According to a third aspect of the present invention, there is provided a computer-readable storage medium comprising the computer program product according to the second aspect.

According to a fourth aspect of the present invention, there is provided an electrical signal embodied on a carrier wave and propagated on an electrical medium, the electrical signal comprising the computer program product according to the second aspect.

According to a fifth aspect of the present invention, there is provided a mobile computing device comprising an electronic display with a screen and a computer-readable storage medium according to the third aspect.

According to a sixth aspect of the present invention, there is provided mobile computing device for determining plant health, which mobile computing device comprises an electronic display with a screen, wherein the mobile computing device is configured to: display on the screen a digital leaf colour chart with colours ranging from yellow green to dark green; display on the screen next to the digital leaf colour chart a white area on which a leaf of the plant is to be placed; receive input from a user about which colour of the digital leaf colour chart that best matches the leaf placed on the white area; and determine the plant health based on the received input. This aspect may exhibit the same or similar features and technical effects as any one of the other aspects, and vice versa.

BRIEF DESCRIPTION OF THE DRAWINGS

These and other aspects of the present invention will now be described in more detail, with reference to the appended drawings showing currently preferred embodiments of the invention.

DETAILED DESCRIPTION

Figure 1:
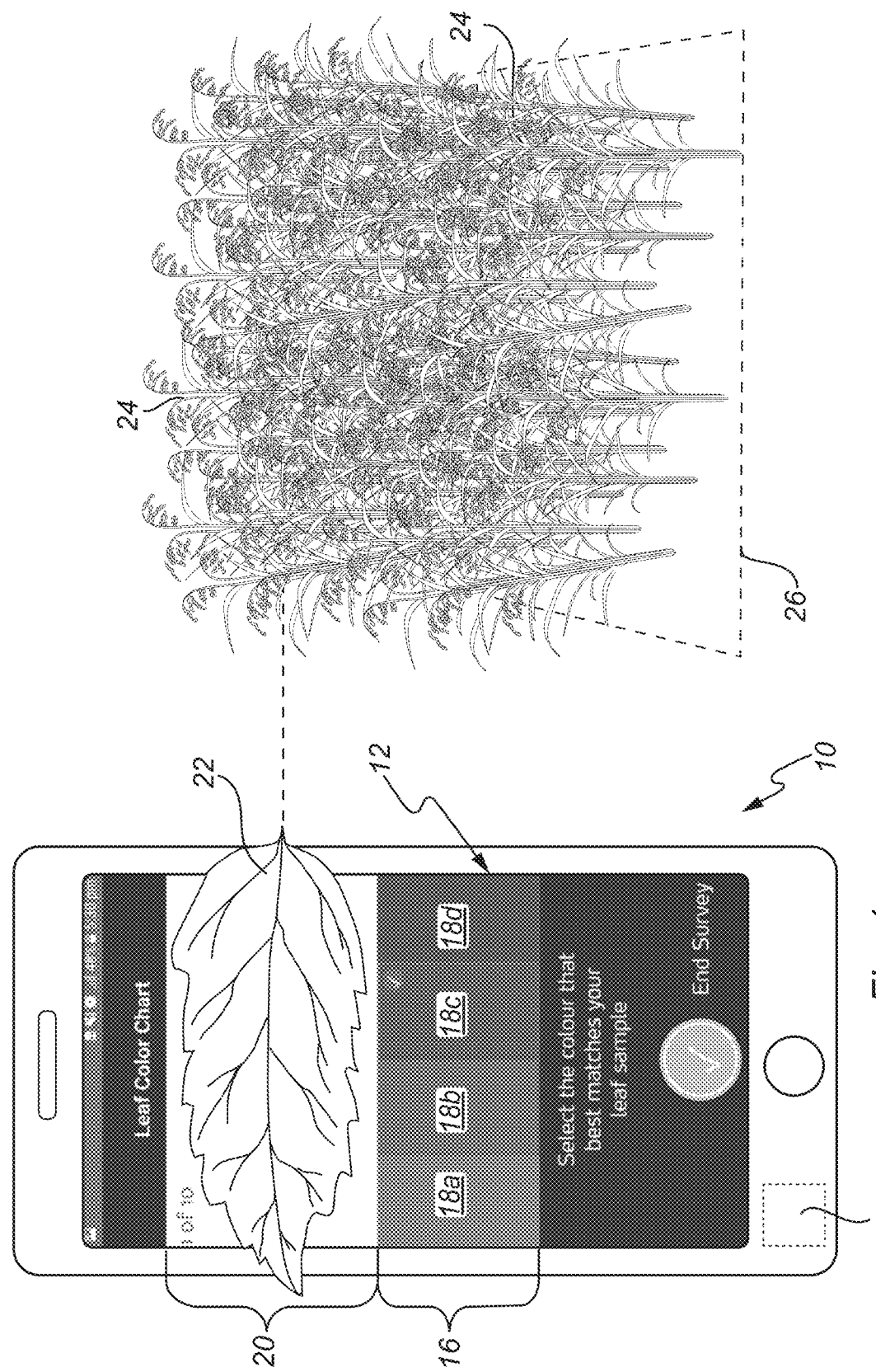
FIG. 1 is a schematic front view of a mobile computing device according to an embodiment of the present invention.

FIG. 1 is a front view of a mobile computing device 10 for determining plant health according to an embodiment of the present invention.

The mobile computing device 10 may be handheld and/or portable. The mobile computing device 10 may for example be a smartphone (e.g. an iPhone or an Android phone) or a tablet (e.g. an iPad).

The mobile computing device 10 comprises an electronic display with a screen 12. The screen 12 may be a touchscreen, so that it except for showing information can serve as a user input device. The mobile computing device 10 may also comprise a processor, a memory, and a storage.

Moving on, the mobile computing device 10 may be configured to perform various specific steps or actions detailed in the following by means of an app 14 (computer program product). The app 14 may be downloaded to the mobile computing device 10 and stored on the aforementioned storage of the mobile computing device 10. The app 14 may run or be executed on the mobile computing device 10 using the aforementioned processor and memory of the mobile computing device 10.

Specifically, the mobile computing device 10 is configured to display on the screen 12 a digital leaf colour chart 16 here comprising a plurality of green strips 18a-d with colours ranging from yellow green to dark green. The illustrated digital leaf colour chart 16 has four green strips 18a-d. The green strips 18a-d are rectangular and arranged alongside each other. Each green strip 18a-d may have a score. For example, the green strip 18a (yellow green) may have score 2, the green strip 18b may have score 3, the green strip 18c may have score 4, and the green strip 18d (dark green) may have score 5. The green strip 18a (yellow green; score 2) may be, for example, characterized by the hexadecimal color code #808C43 or, equivalently by the RGB-code=128, 140, 67. The green strip 18b (score 3) by #5b7934; RGB=91, 121, 52. The green strip 18c (score 4) by #406223; RGB=64, 98, 35. The green strip 18d (dark green; score 5) by #365634; RGB=54, 86, 52. However, other, more or less similar, colors may be selected.

The mobile computing device 10 is further configured to display on the screen 12 next to the digital leaf colour chart 16 a white area 20 on which a leaf 22 from the plant 24 is to be placed. The white area 20 is here rectangular and positioned above the digital leaf colour chart 16. The white area 20 may for example have a width which is in the range of 80-100% (for instance 100% as in FIG. 1) of the width of the screen 12, and a height which is in the range of 30-50% (for instance 40%) of the height of the screen 12. The area of the white area 20 can change based on the dimensions of the crop leaf 22 being considered.

Both the digital leaf colour chart 16 and the white area 20 may be displayed with the electronic display/screen 12 set to maximum brightness.

The mobile computing device 10 is further configured to receive input from a user about which colour of the digital leaf colour chart, i.e. which green strip or which two adjacent green strips of the plurality of green strips 18*a*-*d*, that best matches the leaf 22 placed on the white area 20 in terms of colour. For example, if the user thinks that green strip 18*b* best matches the leaf 22, the user may simply touch the green strip 18*b* on the screen 12. If the colour of the leaf 22 is between two adjacent green strips of the green strips 18*a*-*d*, for example green strips 18*b*-*c*, the user may touch or mark both these green strips 18*b*-*c* on the screen 12. Preferably there is no border or so between the digital leaf colour chart 16 and the white area 20, to facilitate the comparison.

The mobile computing device 10 is further configured to determine the plant health based on the received input. In case the received input for example is green strip 18*d*, determining the plant health for the leaf 22 may include retrieving the score 5. If the received input is two adjacent green strips, the plant health may be determined as the average score of the two adjacent green strips, for example 2.5 if the user selects green strips 18*a*-*b*.

Figure 2:
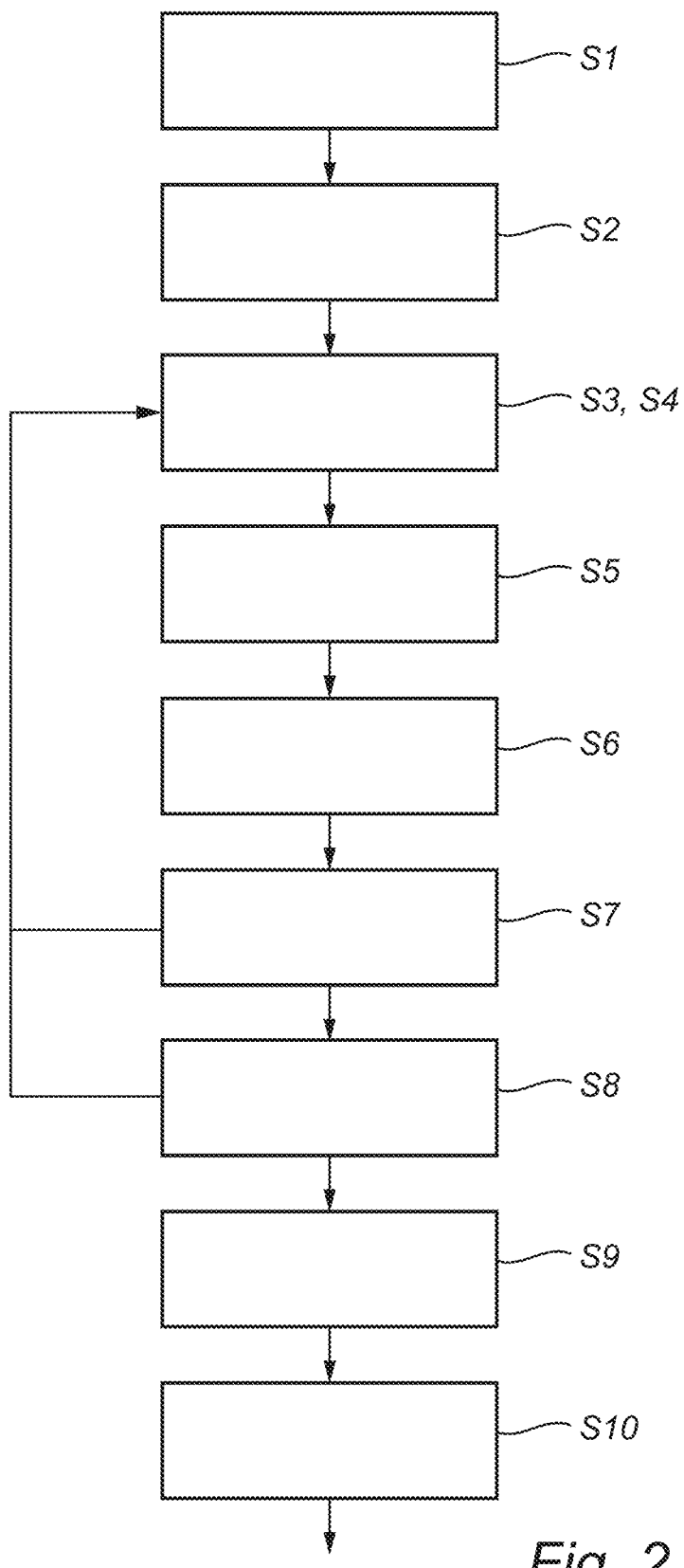
FIG. 2 is a flowchart of a method according to one or more embodiment of the present invention.

FIG. 2 is a flow chart of a method of determining plant health. The method may for example be performed using the mobile computing device 10. Hence the method may correspond to operation of the mobile computing device 10.

Figure 3C:
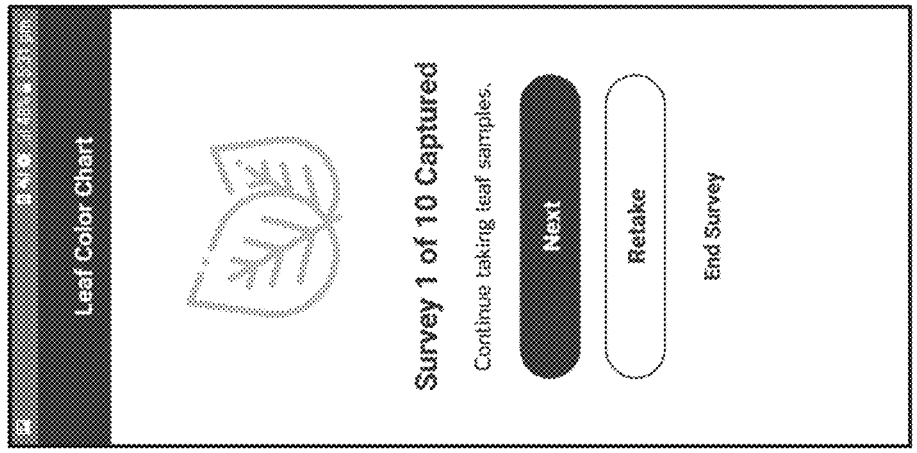
FIGS. 3a-f show various screenshots from the mobile computing device of FIG. 1.
Figure 3B:
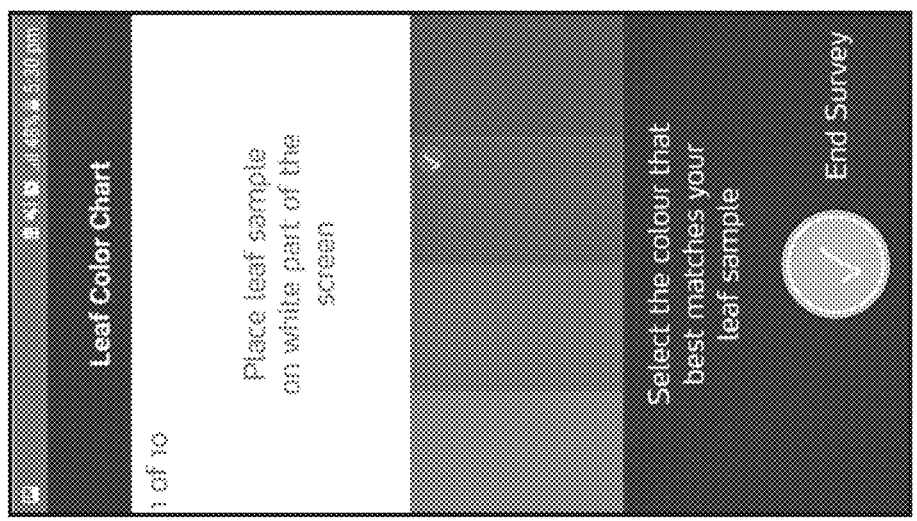
Figure 3A:
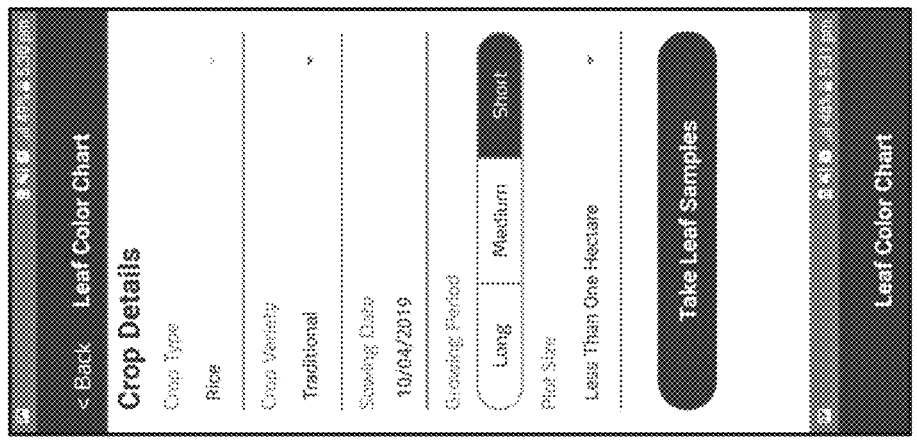

The method may be initiated by mobile computing device 10 receiving crop details associated with the plant's plot 26 from the user (step S1). An exemplary interface on the screen 12 allowing the user to input the crop details is shown in FIG. 3*a*. The crop details may include at least one of crop type (rice, wheat, maize, etc.), crop variety, sowing date, growing period (long, medium, short), and plot size. Crop variety is dependent on the crop; for rice as an example, crop variety may be traditional, aromatic, or hybrid.

Based on the crop type and crop variety of the received crop details (e.g. 'rice' and 'traditional'), the mobile computing device 10 selects an appropriate digital leaf colour chart 16 (step S2), and displays it on the screen 12 (step S3; FIG. 3*b*).

The mobile computing device 10 also displays on the screen 12 next to the digital leaf colour chart 16 the white area 20 on which the leaf 22 is to be placed (step S4).

The user then places the leaf 22 on the white area 20 displayed on the screen 12 (step S5), as indicated in FIG. 1.

The user then selects the colour (i.e. which green strip 18*a*-*d*) that best matches the leaf 22 e.g. by touching the corresponding green step of the green strips 18*a*-*d* on the screen 12 (step S6), whereby the mobile computing device 10 receives input from the user about which green strip (or which two adjacent green strips) of the plurality of green strips 18*a*-*d* that best matches the leaf 22 placed on the white area 20 (step S7).

The mobile computing device 10 may then retrieve the score 2-5 corresponding to the selected green strip of the green strips 18*a*-*d* (=determining the plant health based on the received input; step S8).

Figure 3F:
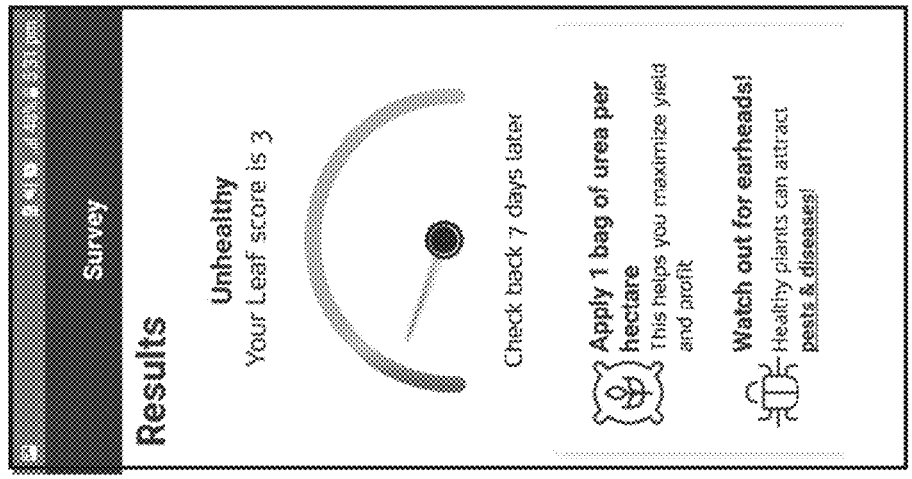
Figure 3E:
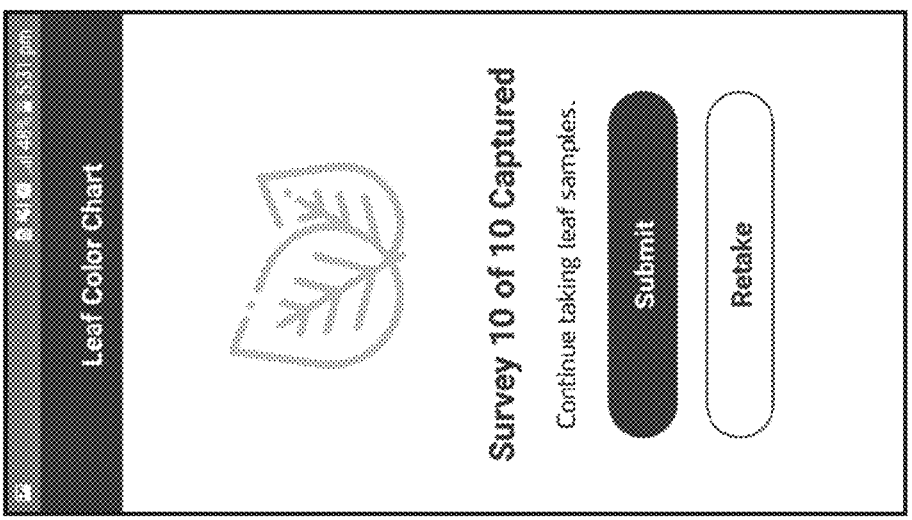
Figure 3D:
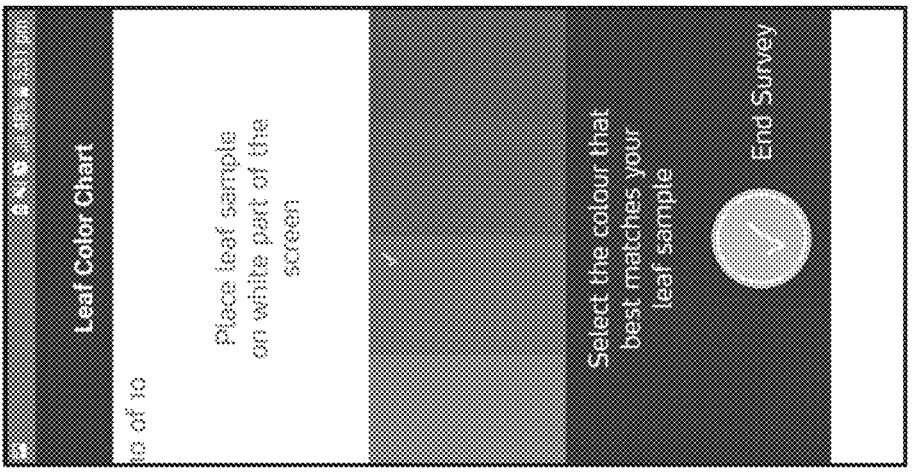

Preferably several leaves are checked, for example ten leaves. Hence once step S7 or S8 is completed (FIG. 3*c*), the method may loop back to steps S3-S4 and again display the digital leaf colour chart 16 and white area 20 on the screen 12 (FIG. 3*d*).

When all (ten) leaves have been checked (FIG. 3*e*), the mobile computing device 10 may determine an average plant health based on the received input for the plurality of different leaves of the plot (step S9). Specifically, the mobile computing device 10 may compute the average score for the ten leaves. As shown in FIG. 3*f*, an exemplary average score could be 3.

In step S10, the mobile computing device 10 may provide a fertilizer recommendation based on the determined average plant health and the received crop details, and show it on the screen 12, as also shown in FIG. 3*f*.

The person skilled in the art realizes that the present invention by no means is limited to the embodiments described above. On the contrary, many modifications and variations are possible within the scope of the appended claims.

Figure 4:
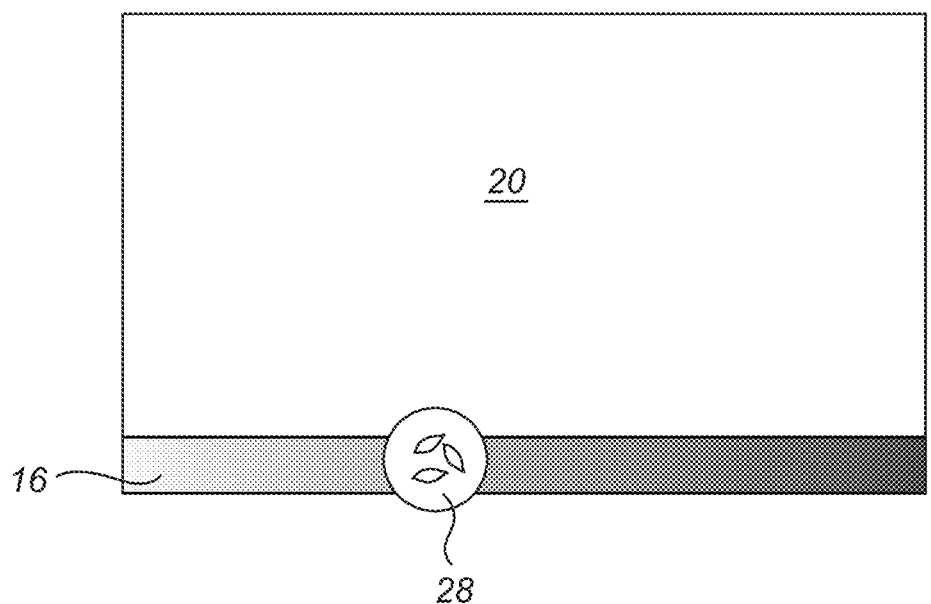
FIG. 4 discloses another embodiment of the digital leaf colour chart.

For example, instead of comprising a plurality of green strips 18*a*-*d*, the digital leaf colour chart 16 may comprise a gradual blend of the colours ranging from yellow green (left) to dark green (right), as shown in FIG. 4. Here, the user can select which colour of the digital leaf colour chart 16 that best matches the leaf placed on the white area 20 by appropriately manipulating a continuous slider 28 displayed (over the digital leaf colour chart 16) on the screen 12. The yellow green may, for example, be characterized by RGB-code=229, 255, 204. The dark green may, for example, be characterized by RGB-code=51, 102, 0.

Furthermore, other applications than determining plant health are envisaged. Hence according to other aspects, there is provided a mobile computing device, which mobile computing device comprises an electronic display with a screen, wherein the mobile computing device is configured to: display on the screen a digital colour palette with different colours; display on the screen next to the digital colour palette a white area on which an object is to be placed; receive input from a user about which colour of the digital colour palette that best matches the object placed on the white area. There is furthermore provided a method, which method comprises: displaying, on a screen of an electronic display of a mobile computing device, a digital colour palette with different colours; displaying on the screen next to the digital colour palette a white area on which an object is to be placed; and receiving input to the mobile computing device from a user about which colour of the digital colour palette that best matches the object placed on the white area. There is provided a computer program product comprising computer program code to perform, when executed on a computer, the steps of: displaying, on a screen of an electronic display, a digital colour palette with different colours; displaying on the screen next to the digital colour palette a white area on which an object is to be placed; and receiving input from a user about which colour of the digital colour palette that best matches the object placed on the white area. The aforementioned object may for example be a piece of fabric, or some other (light transmissive) object. These other aspects may for example be used for colour comparison, to figure out the true colour of the object.

The invention claimed is:

1. A method of determining health of a plant, which method comprises:

displaying, using an application executing on a mobile computing device, a digital leaf colour chart with colours ranging from yellow green to dark green on a screen of an electronic display of the mobile computing device;

displaying on the screen next to the digital leaf colour chart a white area on which a leaf of the plant is to be placed;

receiving input to the mobile computing device from a user about which colour of the digital leaf colour chart that best matches the leaf placed on the white area;

determining, via the mobile computing device, the plant health based on the received input;

providing, via the display on the mobile computing device, a recommendation based at least in part on the plant health.

2. The method according to claim 1, wherein the digital leaf colour chart comprises a plurality of green strips each having a different colour, each different colour being a colour of said colours ranging from yellow green to dark green, and wherein the method comprises receiving input from the user about which green strip or which two adjacent green strips of the plurality of green strips that best matches the leaf placed on the white area.

3. The method according to claim 1, wherein the digital leaf colour chart comprises a gradual blend of said colours ranging from yellow green to dark green.

4. The method according to claim 1, wherein the white area has a width in a range of 80-100% of a width of the screen, and a height in a range of 30-50% of a height of the screen.

5. The method according to claim 1, wherein the digital leaf colour chart and the white area are displayed with the screen set to maximum brightness.

6. The method according to claim 1, comprising receiving crop details associated with a plot of the plant from the user, and selecting the digital leaf colour chart to display on the screen based on one or more of the received crop details.

7. The method according to claim 1, comprising receiving input from the user about which colour of the digital leaf colour chart that best matches the leaf for a plurality of different leaves of a plot and determining an average plant health based on the received input for the plurality of different leaves of the plot.

8. The method according to claim 7, comprising providing a fertilizer recommendation based at least partly on the determined average plant health.

9. The method according to claim 1, wherein the screen is a touchscreen, and wherein the method comprises receiving input from the user about which colour of the digital leaf colour chart that best matches the leaf via the touchscreen.

10. The method according to claim 1, wherein the mobile computing device is a smartphone or tablet.

11. The method according to claim 1, further comprising: the user placing the leaf on the white area displayed on the screen.

12. A computer program product, stored on a non-transitory computer-readable storage medium, comprising computer program code to perform, when executed on a computer, steps of:

displaying, on a screen of an electronic display, a digital leaf colour chart with colours ranging from yellow green to dark green;

displaying on the screen next to the digital leaf colour chart a white area on which a leaf of a plant is to be placed;

receiving input from a user about which colour of the digital leaf colour chart that best matches the leaf placed on the white area;

determining a plant health of the plant based on the received input; and displaying a recommendation based at least in part on the plant health.

13. A mobile computing device comprising an electronic display with a screen and the computer program product, stored on the non-transitory computer-readable storage medium, according to claim 12.

14. The method according to claim 1, wherein the recommendation is a fertilizer recommendation.

15. The computer program product according to claim 12, wherein the recommendation is a fertilizer recommendation.

* * * * *